F. A. & R. F. KINMONT.
POWER TRANSMITTING MECHANISM.
APPLICATION FILED JUNE 13, 1912.
1,097,333.
Patented May 19, 1914.
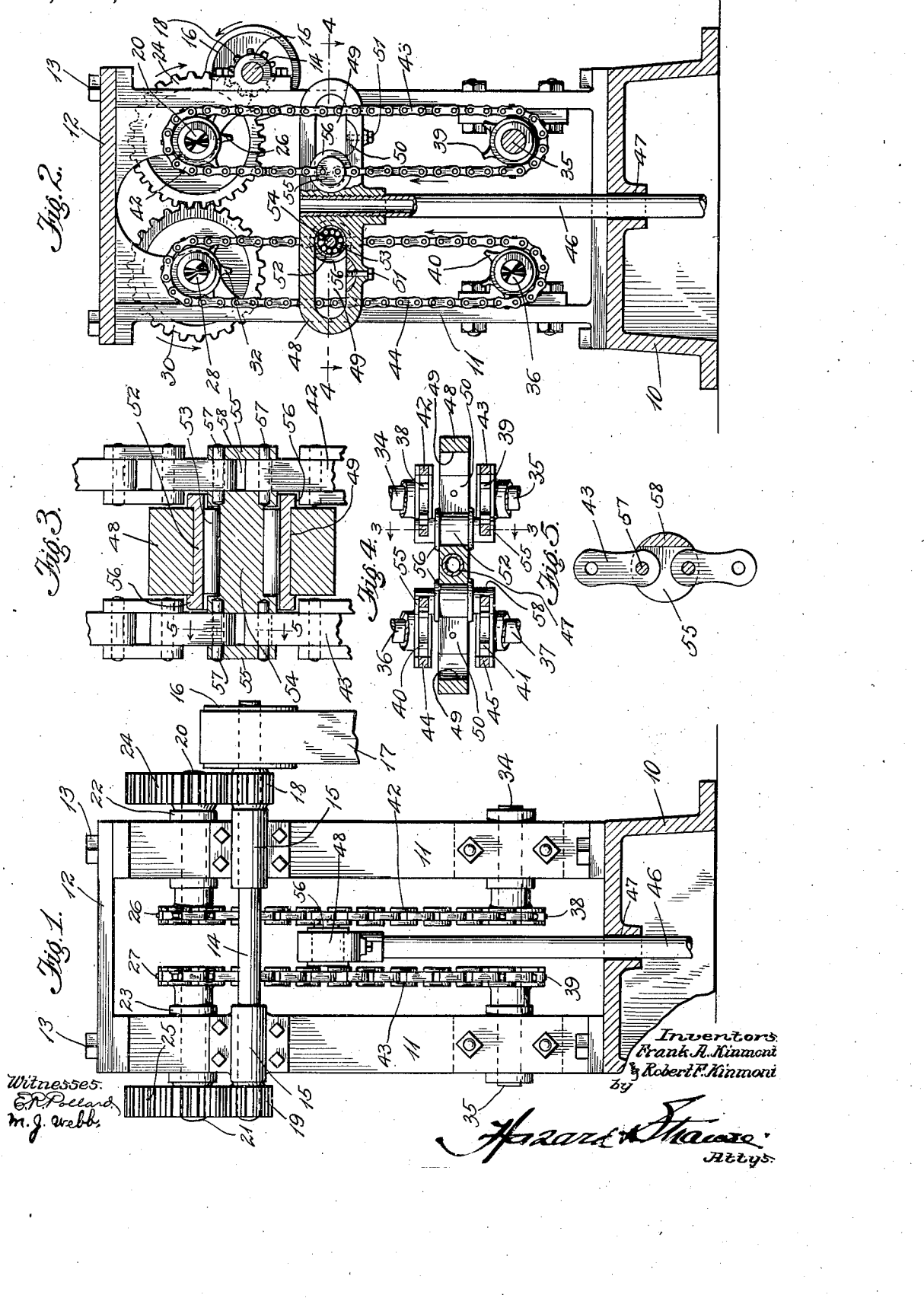

UNITED STATES PATENT OFFICE.

FRANK A. KINMONT AND ROBERT F. KINMONT, OF LOS ANGELES, CALIFORNIA.

POWER-TRANSMITTING MECHANISM.

1,097,333.  Specification of Letters Patent.  Patented May 19, 1914.

Application filed June 13, 1912. Serial No. 703,557.

*To all whom it may concern:*

Be it known that we, FRANK A. KINMONT and ROBERT F. KINMONT, residing at Los Angeles, in the county of Los Angeles, State of California, have invented a new and useful Improvemnt in Power-Transmitting Mechanisms.

This invention relates to that class of power transmission devices more especially adapted to lifting purposes and an object is to provide a mechanical structure that will convert rotary movement into reciprocating action by means of flexible connections.

It is also an important object to provide a power transmitting mechanism whereby rotary action is converted into reciprocating motion with the parts in perfect balance.

It is a further object to provide a power transmitting mechanism which will accomplish the above object with the least friction in the most efficient and economical manner.

In the drawings accompanying this specification and forming a part of the application for Letters Patent; Figure 1 is an end elevation of our device. Fig. 2 is a longitudinal sectional elevation of the device showing the reciprocating member adapted to a lifting pump. Fig. 3 is a section on line 3—3 of the following Fig. 4. Fig. 4 is a cross section on line 4—4 of Fig. 2 looking in the direction of the arrows. Fig. 5 is a sectional detail on line 5—5 showing the links connected to the roller.

More specifically in the drawings, 10 represents the base on which is built the frame composed of vertical columns 11, secured to the base in any suitable manner and united at their top by a suitable cross head 12, secured by bolts 13 to the flanged columns. Suitably mounted on the frame and extending across the end, projecting on either side is shaft 14 suitably journaled in bearings 15 secured to the columns adjacent to that portion of the device. One end of the shaft is shown of greater length and carried on its extended end, keyed in any suitable manner the pulley wheel 16, shown driven by the belt 17 from any suitable source of power. Also mounted on the shaft externally to the columns are the gears 18 and 19 securely keyed to the shaft and rotating in unison therewith preferably in the direction shown by the arrows in Fig. 2.

Adjacent to the shaft 14 and occupying coöperative positions inside the columns are the two shafts 20 and 21 journaled in suitable bearings 22 and 23 and placed in the same axial plane and supported by the columns and crosshead. Mounted on the exterior ends of these shafts are the pinion wheels 24 and 25 meshing respectively with the pinions 18 and 19, their internal ends carrying sprocket wheels 26 and 27 which are adapted to engage sprocket chains and actuate the latter. In the same horizontal plane and occupying the same relative position in relation to the structure are the coöperating shaft 28 and its mate, (hidden in the drawing), which respectively bear on their external ends gear wheels 30 and 31 which in their turn mesh respectively with the gears 24 and 25 which are of necessity all built of the same size. Shaft 28 and its mate also bear on their interior ends sprocket wheel 32 and mate not shown of the same number of teeth and same size as those carried on the coöperating shafts 20 and 21.

In the same vertical plane with the four shafts, coöperating at the upper portion of the frame are placed four idler shafts 34, 35, 36 and 37 revolving in suitable bearings secured to the respective columns adjacent to the shafts. The inner ends of these idler shafts terminate in the same relative position as their corresponding member above and carry on these ends sprocket wheels 38, 39, 40 and 41 of the same size and number of sprockets as those placed above. Traveling over these sprockets and in corresponding vertical planes are four sprocket chains 42, 43, 44 and 45.

In an axial plane mounted centrally with the four sprocket chains is provided a pump rod 46 journaled in the base of the structure at 47 and provided with a cross arm 48. The cross arm extends in the plane from end to end of the machine and is provided with longitudinal guide slots 49, the lower portion of slot being provided with removable sections 50 secured in place by the bolts 51. These guide slots register opposite the path of the adjacent pair of sprocket chains, one member of the sprocket chain with the pinion link on the opposite side supporting between them the roller 52 provided with ball bearings 53 revolving around the shaft 54 which, as before stated, is supported by links 55, forming a section of the chains.

These rollers are preferably formed with annular flanges 56, and as shown in the drawings they are inserted by removing the section of the slide 50 and slipped into the cross-head slot, the annular flanges bearing on the external faces of the cross head and guiding the roller in the cross head. These rollers are placed on the adjacent coöperating portions of the four sprocket chains so that their action is exerted at the same relative distance from the center of the reciprocating member.

As will be readily seen in the operation of our device, power transmitted to the pulley 16 by any suitable means driving the same in the direction of the arrows, moves the gears, meshing with them in the direction, also indicated by the arrows and revolving the shafts in opposite direction, carries the sprocket chains over their respective sprockets in the direction of the arrows and in exactly a coöperative movement and direction, will lift the cross head to a position slightly above the axial plane of the upper side of shafts when the roller by the action of the chain will travel upward and momentarily the reciprocating action will cease until the further movement of the chains carries the rollers down and assisted by gravity carries the reciprocating member downwardly.

As the least pressure falls upon the lower side of the slot, the removable portion 50 has preferably been inserted in this position and the pump rod has been shown threaded into the cross head, but other suitable methods may be adopted and tension devices could be applied to the idler shafts if found necessary.

In Fig. 3 the links 55 are shown with their pins 57 and the connecting bar or reinforcement 58 which materially strengthens the device as shown clearly in Fig. 5.

What we claim is:

1. A power transmitting mechanism, comprising a rotating driving member, a reciprocating member mounted adjacent thereto, a cross head secured to and extending on either side of said reciprocating member provided with a pair of oppositely disposed slots, a plurality of adjacent coöperating pairs of parallel sprocket chains registering with and adapted to pass in parallel direction adjacent to and on both sides of said cross head and each slot, a flanged roller pivotally mounted on a shaft connecting a parallel moving pair of said chains and means to connect said chains to said rotating member.

2. A power transmitting mechanism, comprising a rotating member, a reciprocating member mounted adjacent thereto, two coöperating parallel pairs of sprocket chains adapted to transmit motion from the rotating member to the reciprocating member, a cross head secured to said reciprocating member having oppositely disposed on either side of said member slots registering with the parallel and adjacent path of travel of said parallel pairs of sprocket chains, and means interposed between a pair of oppositely disposed links of said pairs of parallel chains and engaging said slots, whereby a balanced and parallel lift is obtained.

3. A power transmitting mechanism, comprising a rotating driving member, a reciprocating member, a cross head transversely disposed on said reciprocating member provided with slots each having a recessed edge, a sprocket chain registering on either side of said slots in said cross head, flanged rollers mounted in the slots and connecting a registering pair of said parallel sprocket chains, sections to fit said recesses in said slots to allow for the insertion of said flanged rollers, and means to connect said sprocket chains to said rotating member, whereby the adjacent legs of said chains pass in parallel relation and equal speed, to maintain a balanced lift on said reciprocating member.

In witness that we claim the foregoing we have hereunto subscribed our names this 6th day of June, 1912.

FRANK A. KINMONT.
ROBERT F. KINMONT.

Witnesses:
EDMUND A. STRAUSE,
EARLE R. POLLARD.